Sept. 16, 1941.    G. C. MOSHER    2,256,348
HYDRAULIC VEHICLE BRAKE SAFETY CONTROL
Filed Dec. 23, 1940
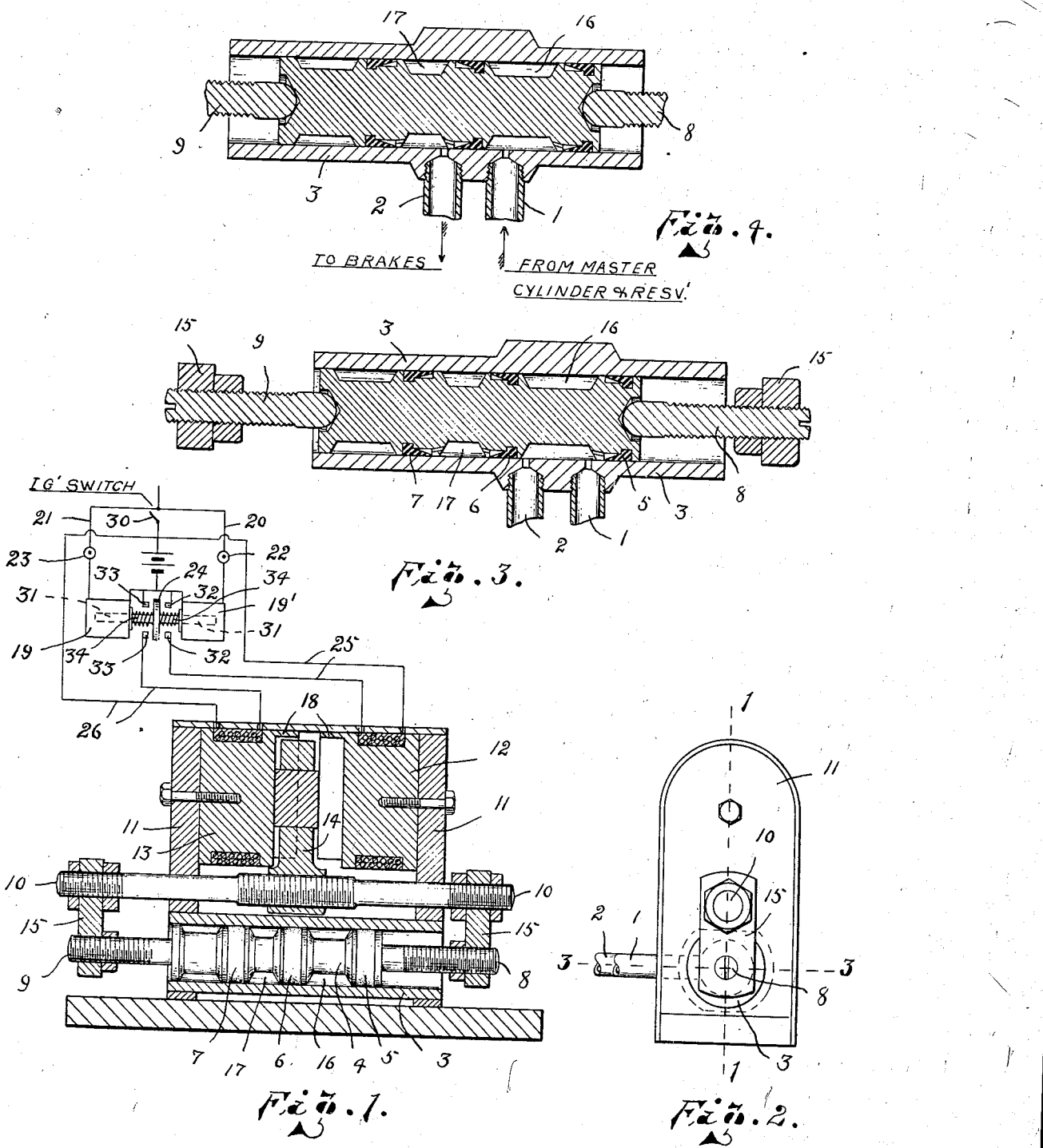
INVENTOR.
Grover C. Mosher.
BY Geo. Stevens.
Atty.

Patented Sept. 16, 1941

2,256,348

UNITED STATES PATENT OFFICE 2,256,348

HYDRAULIC VEHICLE BRAKE SAFETY CONTROL

Grover C. Mosher, Duluth, Minn.

Application December 23, 1940, Serial No. 371,425

3 Claims. (Cl. 188—152)

This invention relates to electric safety control means for hydraulic vehicle brakes, the principal object being to provide means, auxiliary to the conventional hydraulic brake operating mechanism, whereby such brakes may be conveniently locked hydraulically when desired.

Other object and advantages of the specific structure employed will appear in the further description thereof.

Referring now to the accompanying drawing, forming part of this application, and wherein like reference characters indicate like parts:

Figure 1 is a central vertical section on the line 1—1, Figure 2, through the auxiliary control unit, and with the electric connections thereto illustrated diagrammatically.

Figure 2 is an end elevation of Figure 1.

Figure 3 is an enlarged vertical sectional view of the valve portion only of the unit, taken on the line 3—3, Figure 2.

Figure 4 is a view similar to Figure 3 of the valve control in the opposite position to that shown in Figure 3.

The auxiliary control means is installed in the fluid pipe leading from the master cylinder and reservoir to the brakes of the vehicle, and the terminal connections of said fluid pipe to the valve cylinder 3 of such unit is clearly illustrated at 1 and 2 of the drawing.

Within the cylinder 3 is installed a reciprocable multi-spool-like piston valve 4, and within the heads of said piston are incorporated suitably disposed expandable cup washers illustrated at 5, 6 and 7, the object of which will be described later. The piston 4 is of floating type and controlled as by suitable adjustable piston rod sections 8 and 9 which extend beyond the opposite ends of the cylinder 3 and are connected with the reciprocable operating shaft 10, parallel therewith and installed thereabove within the housing 11 of the electrically controlled unit.

This latter carries spaced electro-magnets 12 and 13, and centrally of the shaft 10, is carried an upstanding armature 14 extending intermediate of said magnets for alternately functioning therebetween and controlled thereby for operating said shaft.

The connections of the short terminal pistons 8 and 9 to their respective ends of the shaft 10 are accomplished as by short link like members 15, screw threadedly carried on both such elements and made readily adjustable thereupon to compensate for varied requirements of such, and due to such connections, obviously, the shaft 10 becomes the operating shaft of the spool valve or piston 4.

It will be noted that the cup washers 5 and 6 upon the valve 4 at either terminal of the annular port 16 are so disposed as to prevent the liquid from passing out of said port except towards and into the smaller port 17, and that both of the cup washers 6 and 7 are so disposed as to prevent the fluid from passing in either direction from the port 17 except into the fluid pipe connection 2, thus providing positive means of holding the brakes applied when the valve 4 is in the position shown in Figure 4 of the drawing, said valve 4 having of course assumed that position by action of the electro-magnet 12, it having previously been in the position shown in Figures 1 and 3 of the drawing, by the action of the electro-magnet 13 and at which time the fluid was free to enter the port 16, when the brakes were applied.

Here it is to be noted that each magnet 12 and 13 is provided with integral hood-like extensions 18 thereof upon their inner opposed faces and partly surrounding the armature 14 to assist in the quicker action of same when the magnets are alternately energized.

While the electric circuit for operating this auxiliary unit may be independently operated, it is preferred that the same be directly associated with the ignition switch of the vehicle upon which it is installed, and the diagrammatic showing of such circuit is that illustrated in connection with Figure 1 of the drawing. A double acting solenoid 19—19' is installed within the two circuits shown at 20 and 21 controlled by the ignition switch 30. The solenoid is provided with the reciprocable iron core 31 having mounted thereon the contact armature 24 which alternately makes contact with the spaced contacts 32—32 of the circuit 25, and the contacts 33—33 of the circuit 26. Within the circuit 20 is installed a push-button 22 for optionally closing the circuit 20 to the solenoid 19', and a similar push button 23 is installed within the circuit 21 for optionally closing the circuit 21 to the solenoid 19, of course, only when the ignition switch is closed, and which provides simple selective means for reciprocation of the armature 24 that it may alternately function in closing the main circuits 25 and 26 to the electro-magnets 12 and 13, respectively. Obviously, it is only necessary for the circuit 25 or the circuit 26 to be closed for a sufficient length of time to permit the magnet 12 or 13 to draw the armature 14 and its associated valve from one position to the other, and therefore I have shown a pair of expansion springs 24 one upon either side of the armature 24 between it and the adjacent solenoid so that when either push button 22 or 23 is released the armature 24 will by the action of one or the other of said springs be moved to a neutral position.

By such connection it is readily apparent that when the circuit 20 has been closed by action of the push-button 22, after the brakes have been set and the ignition key removed, the action of the solenoid 19' will close the circuit 25 to the magnet 12 which will draw the armature 14 and valve 4 to its opposite position and prevent fluid passing through the cylinder 3, and thus the brakes will remain set, since the fluid pressure thereto cannot be released until the ignition circuit is closed and the armature 14 moved to its opposite position by the closing of the opposite circuits 21 and 26, and which will obviously open communication in the brake fluid line.

By this ignition circuit control of the electric circuits which operate the auxiliary unit, it is apparent that the auxiliary unit is directly connected to the battery only when being operated.

Having thus described my invention, what I claim and desire to secure by Letters Patent, is:

1. In a motor vehicle having an electric ignition system and hydraulically operated brakes, a cylinder having intake and exhaust ports communicating with the main fluid line of said brakes whereby the fluid must pass into and out of said cylinder to control said brakes, a spool piston within said cylinder, movable to prevent passage of said fluid from one port to another, spaced magnets, a shaft adjacent said magnets, an armature reciprocable between said magnets and longitudinally adjustably mounted upon said shaft, adjustable means connecting said shaft and said piston, and manually controlled means for energizing either magnet whereby said piston may be moved to control flow of said fluid to said brakes.

2. In a motor vehicle having an electric ignition system and hydraulically operated brakes, a cylinder having intake and exhaust ports communicating with the main fluid line of said brakes whereby to control the flow of fluid thereto, a spool piston within said cylinder for the control of said ports, spaced magnets, an armature reciprocable between said magnets, adjustable means for connecting said armature and said piston, and means for energizing either magnet whereby said piston may be moved to control flow of said fluid to said brakes.

3. In a motor vehicle having an electric ignition system and hydraulically operated brakes, a cylinder having intake and exhaust ports communicating with the main fluid line of said brakes whereby to control the flow of fluid thereto, a spool piston within said cylinder for the control of said ports, spaced magnets, an armature reciprocable between said magnets, adjustable means for connecting said armature and said piston, and auxiliary electric circuits operable when the ignition circuit is closed for selectively energizing said magnets whereby said piston may be moved to control flow of said fluid to said brakes.

GROVER C. MOSHER.